United States Patent [19]

Schladetsch et al.

[11] 4,115,380
[45] Sep. 19, 1978

[54] PROCESS FOR THE PREPARATION OF DIHYDROXYPHENYLAZO-PHENYLAZOPHENYL DYESTUFFS

[75] Inventors: Hans Jakob Schladetsch, Frankfurt am Main; Günther Schroth, Muhlheim, Main, both of Fed. Rep. of Germany

[73] Assignee: Hoechst Aktiengesellschaft, Frankfurt am Main, Fed. Rep. of Germany

[21] Appl. No.: 788,763

[22] Filed: Apr. 19, 1977

[30] Foreign Application Priority Data

Apr. 21, 1976 [DE] Fed. Rep. of Germany ....... 2617302

[51] Int. Cl.² .................. C09B 31/06; D06P 1/04; D06P 3/42; D06P 3/54
[52] U.S. Cl. ................................. 260/186; 260/144; 260/208
[58] Field of Search ..................... 260/186, 144

[56] References Cited

U.S. PATENT DOCUMENTS

| 2,072,252 | 3/1937 | Ellis ................... 260/186 |
| 2,782,185 | 2/1957 | Merian ................ 260/186 |
| 2,954,371 | 9/1960 | Liechti ................ 260/186 |
| 3,045,004 | 7/1962 | Gaetani ............... 260/186 |
| 3,523,935 | 8/1970 | Armento et al. .... 260/186 |

FOREIGN PATENT DOCUMENTS 1,016,246  1/1966  United Kingdom ................ 260/186

*Primary Examiner*—Floyd D. Higel
*Attorney, Agent, or Firm*—Curtis, Morris & Safford

[57] ABSTRACT

Process for the manufacture of a disazo dyestuff of the formula

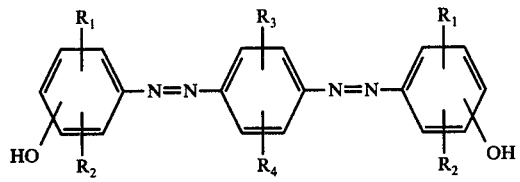

in which $R_1$ and $R_2$ each stand for hydrogen, chlorine, bromine, alkyl of 1 to 4 carbon atoms or alkoxy of 1 to 4 carbon atoms, $R_3$ and $R_4$ each stand for hydrogen, chlorine, bromine, nitro, trifluoromethyl, alkyl of 1 to 4 carbon atoms or alkoxy of 1 to 4 carbon atoms; and the hydroxyl groups each stand in 2- or 4-position to the azo groups which comprises diazotizing a 2- or 4-hydroxy-4'-aminoazobenzene of the formula

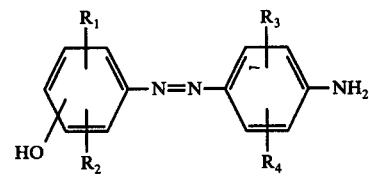

in which $R_1$, $R_2$, $R_3$ and $R_4$ are defined as above, with an alkali metal nitrite in an aqueous mineral acid, the normality of which being about $10^{-2}$ to 5, in the presence of a phenol capable of being coupled of the formula

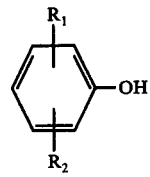

in which $R_1$ and $R_2$ are defined as above and subsequently reacting the diazonium salt obtained with the phenol by raising the pH to a value between about 3 and 11, the surprising feature of this process (diazotization in the presence of the phenol) being that practically no nitrozation or a nitration of the phenol occurs.

6 Claims, No Drawings

PROCESS FOR THE PREPARATION OF DIHYDROXYPHENYLAZOPHENYLAZOPHENYL DYESTUFFS

The present invention relates to a process for the preparation of disazo dyestuffs.

The present invention provides a novel process for the preparation of disazo dyestuffs of the formula (I)

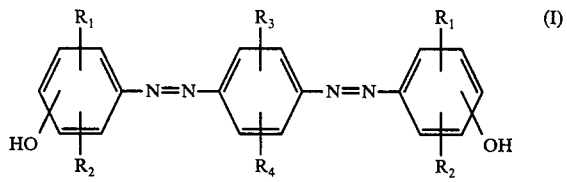

in which $R_1$ and $R_2$ represent, independent of each other, a hydrogen atom or a water-insolubilizing substituent, such as a halogen atom, for example a chlorine or bromine atom, or an alkyl or alkoxy group having from 1 to 4 carbon atoms, $R_3$ and $R_4$ represent, independent of each other, a hydrogen atom or a water-insolubilizing substituent, for example a halogen atom, such as a chlorine or bromine atom, or a nitro, trifluoromethyl, alkyl or alkoxy group having from 1 to 4 carbon atoms, and wherein the OH groups stand in the 2- or 4-position to the azo groups, which comprises diazotizing a 2- or 4-hydroxy-4'-aminoazobenzene of the formula (II)

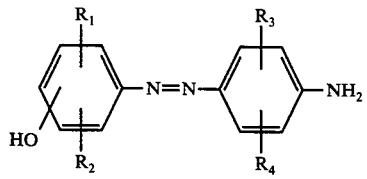

in which $R_1$, $R_2$, $R_3$ and $R_4$ are defined as above, in an aqueous mineral acid, such as aqueous hydrochloric, sulfuric or phosphoric acid with a normality of from about $10^{-2}$ to 5, preferably from $10^{-1}$ to 2, in the presence of a phenol capable of being coupled of the formula (III)

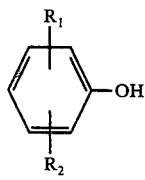

in which $R_1$ and $R_2$ are defined as above, and subsequently reacting the diazonium salt obtained with the phenol of the formula (III) already present in the reaction medium by raising the pH value.

The novel process of the invention is particularly important in the preparation of the disazo dyestuffs of the formula (I) which are valuable for dyeing and which have as their basis hydroxyazobenzenes of the formula (II), which are present in admixture with phenols of the formula (III). Mixtures of this kind are obtained, if for the preparation of the compounds (II) there are used as starting compounds monodiazotized p-phenylenediamines of the formula (IV)

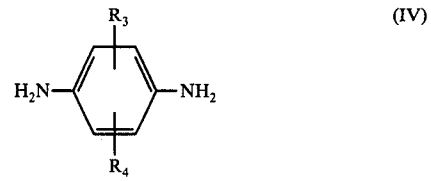

in which $R_3$ and $R_4$ are defined as above, since the corresponding 4-amino-benzene-diazonium salts can only be coupled advantageously in a considerable excess of phenols of the formula (III).

The virtually surprising feature in this novel process of diazotization in the presence of phenols is to be seen in the fact that a nitrozation or nitration of the phenols (III), which would have been expected according to the specifications given in literature (for example HOUBEN-WEYL, Methoden der organischen Chemie, Stuttgart 1971, vol. X/1, pages 1028 et$_{seq.}$), does practically not occur.

The diazctization of the hydroxyaminoazo compound (II) is preferably carried out in such a way that either (a) mineral acid is introduced into the present solution of the hydroxyaminoazobenzene of the formula (II), of the phenol of the formula (III) and of alkali metal nitrate in aqueous sodium hydroxide solution, or (b) a solution of the hydroxyaminoazobenzene of the formula (II), of the phenol of the formula (III) and of alkali metal nitrite in aqueous sodium hydroxide solution is introduced into the present mineral acid, or (c) an aqueous alkali metal nitrite solution is introduced into the present aqueous suspension of the hydroxyaminoazobenzene of the formula (II) and of the phenol of the formula (III) in an aqueous mineral acid.

The concentration of the mineral acid, such as hydrochloric acid, sulfuric acid or phosphoric acid, in the respective diazotization mixture should correspond to a normality of from about $10^{-2}$ to about 5, preferably from about $10^{-1}$ to about 2.

As to the alkali metal nitrite, for example solution nitrite, use is made of the equivalent amount, calculated on the diazotizable amino group; in order to ensure a complete diazotization, it is sufficient to apply an excess amount of nitrite in the range of from 1 to 5% of the equivalent amount.

During the diazotization the temperature is in the range of from −20° to +20° C, however, preferably from 0 to 5° C.

The amount of phenol present in the diazotization process may vary within wide limits. Thus, the diazotization is carried out in the presence of from about 5 to 150 molar %, however, preferably from about 10 to 105 molar % of the amount equivalent to the hydroxyaminoazobenzene.

The coupling of the so-obtained diazonium salt of the aminoazo compound (II) with the phenol (III) already present in the diazotization mixture is achieved by adding an alkali metal hydroxide solution or an alkali metal carbonate or -acetate, such as sodium carbonate or sodium acetate, in a solid form or dissolved in water, optionally after having increased the phenol proportion to the amount which is equivalent to the diazonium salt.

However, the coupling may also be effected in such a way that the suspension of the diazotized compound (II) in admixture with an equivalent amount of the phenol (III) is introduced into an aqueous sodium carbonate solution.

The pH range which is most favorable for the coupling reaction is from about 3 to 11.

The diazotization process of the invention for preparing the disazo dyestuffs (I) on the basis of p-phenylenediamines (IV) is advantageously carried out as follows:

The diamine (IV) is at first monodiazotized (first diazotization), and the 4-amino-benzene-diazonium salt obtained is then reacted with phenol (III) in a considerable excess amount, to yield hydroxyaminoazobenzene (II) (first coupling). The novel diazotization process now permits to further diazotize the intermediate product (II) formed in a direct manner (second diazotization), without previously isolating this compound in the form of the phenol-free product, as it has been the usual method so far. Subsequently the reaction product is coupled (second coupling) with the phenol left over the first coupling, which has optionally been filled up to the amount equivalent to that of the diazotized intermediate product (II), to give the dyestuff (I). The considerable excess amount of phenol used in the first coupling reaction has a favorable effect both on the reaction time and on the quality of the hydroxyaminoazobenzene being formed.

Due to the amino group standing in para-position, 4-amino-benzene-diazonium salts belong to the slightly electrophilic and thus less active diazonium salts, as has already been known. This leads to the effect that their coupling with phenols which are present only in slight excess amount also develops only in a very low rate. Thus, for example, the reaction of the 4-amino-benzene-diazonium salt with twice the equivalent amount of phenol to give 4-hydroxy-4'-aminoazobenzene at a pH value of from 9.0 to 9.5 and at a temperature of 25° C is completed within 30 minutes, whereas with an excess amount of only 5% it takes about 6 hours under the same reaction conditions. At the same time, such a prolongation of the reaction time results in a considerable increase of the loss of the diazonium compound due to decomposition reactions which lead to reduced yields of the reaction product as well as to tarry admixtures to the same which can only be removed with difficulty.

The excess amount of phenol in the first coupling reaction is as a rule in the range of from about 10 to 105% of the amount equivalent to that of the 4-amino-benzene-diazonium salt. In this connection, the lower limit of about 10% of phenol excess is a pre-condition for obtaining an unobjectionable reaction product with a coupling that is effected as fast as possible.

The upper limit of 105% of phenol excess is based on the fact that on the one hand a further increase of this excess amount does not generally have a favorable influence on the reaction rate and the quality of the reaction product and that on the other hand an excess amount of this level usually meets the requirement of coupling component in the second coupling. These being the facts, an excess of phenol of about 100% has the advantage that a single dosage of phenol is sufficient during the entire dyestuff synthesis. If the excess amount is less than 100%, care has to be taken, naturally, that the amount of phenol present in the second coupling is made up to the amount equivalent to that of the diazotized aminoazo compound.

There are various advantages of the process for preparing disazo dyestuffs of the formula (I) made possible by the diazotizing process of the invention, compared with the process known in the art which encompasses an intermediate isolation of the aminoazo compound (II). First of all, the novel process of preparation requires but a considerably reduced expenditure with regard to apparatuses, time and energy, owing to the fact that the intermediate isolation is no more necessary. Furthermore, higher yields of the diazo dyestuffs are obtained, since the reaction product of the first coupling reaction is further processed without losses due to isolation. However, the novel process has the special advantage that it does not lead to waste waters having a high content of phenol. This is of particular importance, because due to their adverse effect on the senses of smell and taste and also their toxicity, phenols are classed with those substances which are dangerous for water already in minor amounts and thus belong to the category of substances which are most dangerous for the environment.

A mixture of valuable disazo dyestuffs (I) may be obtained, if in the first coupling reaction the phenol component (III) used does not represent a homogeneous compound, but a mixture of, for example, phenol ($R_1$ and $R_2$ = H) and o-cresol ($R_1$ = H, $R_2$ = $CH_3$).

In this case a mixture of dyestuffs of the following formulae is obtained, in which $R_3$ and $R_4$ are defined as above:

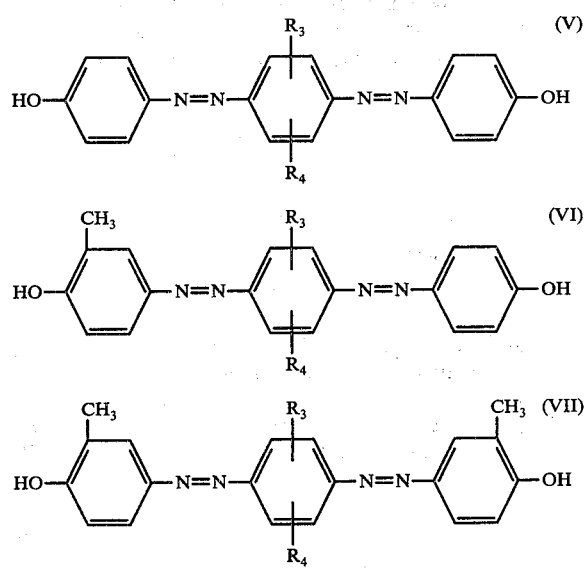

The reprecipitation of the disazo dyestuffs obtained which is mentioned in the following Examples does not have a specific cause in the process described herein of the diazotization of hydroxyaminoazobenzenes in the presence of phenols which are subsequently used as coupling components. Said reprecipitation is equally suitable when the diazotization is carried out with the exclusion of phenols. These reprecipitation processes have a favorable effect on the applicability of the disazo dyestuffs described with regard to the dyeing technique. Thus, the preparation of dispersions of these compounds which are stable in application is considerably facilitated, and the color shade of the dyeings obtained with them, especially on polyester material, is much clearer and more appealing.

In the following Examples the parts by weight are to the parts by volume as is the kilogram to the liter.

EXAMPLE 1

21.3 Parts by weight of 4-hydroxy-4'-aminoazobenzene are dissolved in 1000 parts by volume of water, while adding 20 parts by volume of a 33% by weight sodium hydroxide solution. Thereafter 9.8 parts by weight of phenol, 6.9 parts by weight of sodium nitrite and ice are added in such an amount that a temperature of from 0° to 5° C is established. For the diazotization reaction, 53 parts by volume of a 31% by weight hydrochloric acid are rapidly added, and the mixture is stirred for 30 minutes with a minor excess of nitrite, in which process a small amount of sodium nitrite is optionally to be added. Subsequently, the nitrite excess is destroyed with amidosulfonic acid, and the reaction mixture is introduced for coupling into a solution of 25 parts by weight of sodium carbonate ($Na_2CO_3 \cdot H_2O$) in 200 parts by volume of water, while stirring. For after-treatment the reaction mixture is heated to 80° C, the dyestuff is dissolved in 40 parts by volume of a 33% by weight sodium hydroxide solution, then the mixture is stirred for about 15 minutes at the specified temperature, and the dyestuff is precipitated again by adding 50 parts by volume of a 31% by weight hydrochloric acid. The dyestuff is suction-filtered, washed until it is free from salt and dried. In this manner, 28.5 parts by weight of a disazo dyestuff of the formula (VIII)

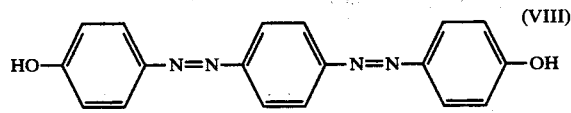

are isolated, whose technical importance is to be seen in the dyeing of synthetic fiber materials. In this process, reddish yellow dyeings are obtained on articles made of aromatic polyesters, such as polyethylene-terephthalates, which dyeings are particularly valuable with regard to the dyeing technique (DBP = German Patent Specification No. 1 154 433).

EXAMPLE 2

108 Parts by weight of p-phenylene-diamine which are placed into 300 parts by volume of water and 1000 parts by weight of ice are diazotized at a pH of from 1.5 to 3.5 by adding a total of about 200 parts by volume of 31% by weight hydrochloric acid and about 69 parts by weight of sodium nitrite in an aqueous solution. Upon clarification with active charcoal/guhr, 180 parts by weight of phenol are added, and a pH in the range of from 8 to 11 is established with 90 parts by volume of a 33% by weight sodium hydroxide solution. Within 30 minutes the 4-amino-benzene-diazonium salt is coupled to give the 4-hydroxy-4'-aminoazobenzene. Subsequently 170 parts by volume of 33% by weight of sodium hydroxide solution and 65 parts by weight of sodium nitrite are added.

The solution obtained is then introduced, while stirring, into a mixture of 600 parts by volume of 31% by weight hydrochloric acid and about 2500 parts by weight of ice.

The diazotization of the 4-hydroxy-4'-aminoazobenzene is completed when an excess of from 0.5 to 1 part by weight of sodium nitrite can still be dectected after 30 minutes. The reaction mixture has in this case a hydrochloric normality of from 0.3 to 0.5.

After destroying a minor nitrite excess with amidosulfonic acid, the diazonium salt suspension obtained is introduced into a solution of 400 parts by weight of sodium carbonate ($Na_2CO_3 \cdot H_2O$) in 400 parts by volume of water and 600 parts by weight of ice. The reaction mixture is continued to be stirred for 30 minutes, then it is heated to 80° C for after-treatment; the dyestuff is dissolved by adding 450 parts by volume of 33% by weight sodium hydroxide solution, is stirred for 15 minutes at the specified temperature and is reprecipitated by adding 550 parts by volume of 31% by weight hydrochloric acid. Thereafter the dyestuff is suction-filtered and washed with water until it is free from salt. After drying, 272 parts by weight of the valuable disazo dyestuff of the formula (VIII) are isolated.

EXAMPLE 3

At a temperature in the range of from 0° to 5° C, 20 parts by volume of a 33% by weight sodium hydroxide solution are introduced into 1500 parts by volume of an aqueous suspension of 21.3 parts by weight of 4-hydroxy-4'-aminoazobenzene in the presence of 9.4 parts by weight of phenol, so that the components are dissolved. After 55 parts by volume of a 31% by weight hydrochloric acid have been added as rapidly as possible, the mixture is subsequently diazotized within 10 minutes with 50 parts by volume of a 2N-sodium nitride solution until the nitrite reaction is achieved. With the nitrite reaction being maintained, the mixture is continued to be stirred for 30 minutes, and the reaction is subsequently followed up according to the method described in Example 1, up to the isolation of the disazo dyestuff of the formula (VIII).

EXAMPLE 4

At a temperature of from 0 to 5° C and at a pH of 2±0.5, 15.3 parts by weight of 2-nitro-1,4-diaminobenzene are monodiazotized in 400 parts by volume of water, by adding alternately a total of 20 parts by volume of a 31% by weight hydrochloric acid and 100 parts by volume of a 1N-sodium nitrite solution. Upon clarifying the diazonium salt solution with guhr, said solution is introduced within 20 minutes into a solution of 25 parts by weight of 2-chlorophenol in 200 parts by volume of a 1N-sodium hydroxide solution. In the course of this process, the diazonium salt is coupled so rapidly that the 4-hydroxy-4'-amino-azobenzene compound formed may be dissolved immediately after combining te reaction components with 100 parts by volume of a 2N-sodium hydroxide solution. After having added 95 parts by volume of a 1N-sodium nitrite solution, the solution is introduced, while stirring, into a mixture of 80 parts by volume of 31% by weight hydrochloric acid and 750 parts by weight of ice. In order to complete this second diazotization, the reaction mixture is continued to be stirred for 30 minutes with a small excess of nitrite which is subsequently reduced with a few drops of an amidosulfonic acid solution. For the second coupling, 600 parts by volume of a 2N-sodium carbonate solution are rapidly added to the diazonium salt suspension. After the reaction mixture has been continued to be stirred for 20 minutes, the dyestuff is worked up by being dissolved with sodium hydroxide solution at 80° C and reprecipitated with hydrochloric acid. The dyestuff is filtered off with suction, washed and dried. 38.5 Parts by weight of a disazo dyestuff of the formula (IX).

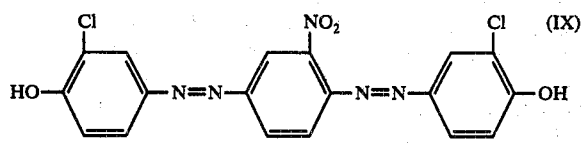

are isolated which yields on polyester fabrics yellow dyeings having good fastness properties.

EXAMPLE 5

If in Example 4 the 15.3 parts by weight of 2-nitro-1,4-diaminobenzene are replaced by 17.6 parts by weight of 2-trifluoromethyl-1,4-diaminobenzene, the disazo dyestuff of the formula (X)

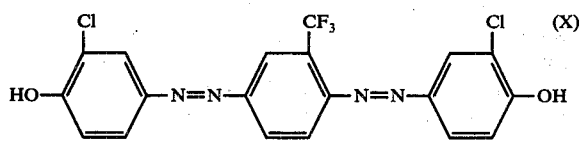

is obtained which dyes polyester fabric in a yellow shade.

EXAMPLE 6

17.7 Parts by weight of 2,6-dichloro-1,4-diamino-benzene are monodiazotized in 200 parts by volume of water in the presence of hydrochloric acid in the pH range of from 2 to 2.5. The clarified diazonium salt solution is introduced into a solution of 18 parts by weight of phenol and 54 parts by volume of 2N-sodium hydroxide solution in 200 parts by volume of water. The mixture is continued to be stirred for 20 minutes for coupling. Subsequently the 4-hydroxy-4'-amino-azobenzene compound is dissolved by adding 180 parts by volume of 2N-sodium hydroxide solution, 19 parts by volume of 5N-sodium nitrite solution are added, and the solution is introduced, while stirring thoroughly, into a mixture of 80 parts by volume of 31% by weight hydrochloric acid and 750 parts by weight of ice. The mixture is continued to be stirred for 30 minutes with a small excess of nitrite, said nitrite excess is then removed and the diazonium salt suspension is introduced into 400 parts by volume of 2N-sodium carbonate solution. In order to complete this second coupling, the mixture is continued to be stirred for 1 hour. The dyestuff is reprecipitated at 80° C and then isolated. 33 Parts by weight of the disazo dyestuff of the formula (XI)

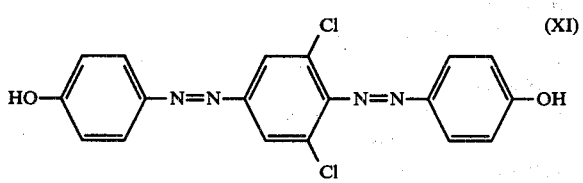

are obtained which dyes polyester fabric in a yellow shade.

EXAMPLE 7

If in Example 6 the 2,6-dichloro-1,4-diaminobenzene is replaced by the 2,5-dichloro-1,4-diaminobenzene and the process is otherwise carried out has been described in said Example, the disazo dyestuff of the formula (XII)

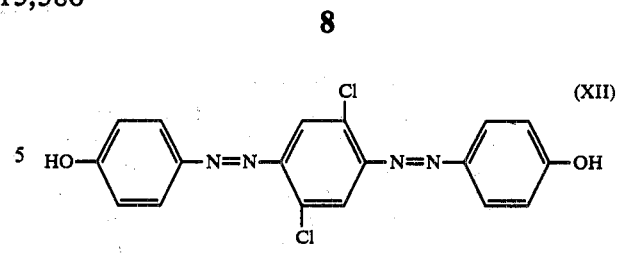

is obtained which also dyes polyester fabric in a yellow shade.

EXAMPLE 8

At a temperatutre of 80° C, hydrazine is allowed to act — in the presence of Raney nickel — on 18.2 parts by weight of 2-nitro-5-amino-4-methoxy-toluene in 100 parts by volume of water, until no nitro compound can be detected any more. The 2-methoxy-5-methyl-1,4-diaminobenzene having been formed is dissolved by an addition of hydrochloric acid up to a pH value of from 2 to 2.5. After filtering off from the Raney nickel, the diamine is monodiazotized at a temperature of from 0° to 5° C in the pH range of from 1.5 to 3.5 with a further addition of hydrochloric acid. Subsequently, the process is carried out according to the specifications of Example 6 and a disazo dyestuff of the formula (XIII)

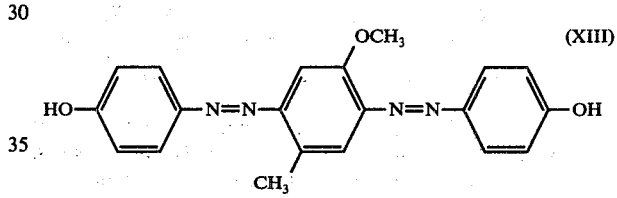

is obtained which dyes polyester fabric in an orange shade.

EXAMPLE 9

If in Example 2 the 180 parts by weight of phenol are replaced by 234 parts by weight of 2,6-dimethyl-phenol and the process is otherwise carried out as has been described in said Example, the disazo dyestuff of the formula (XIV)

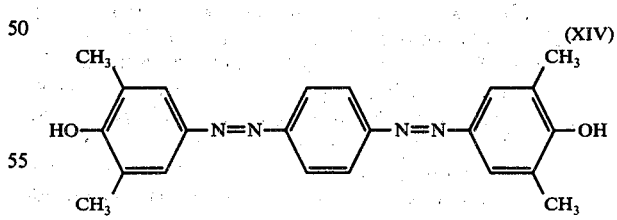

is obtained which dyes polyester fabric in a reddish yellow shade.

EXAMPLE 10

If in Example 2 the 180 parts by weight of phenol are replaced by 207 parts by weight of 4-methyl-phenol and the process is otherwise carried out as has been described in said Example, the dispersion dyestuff of the formula (XV)

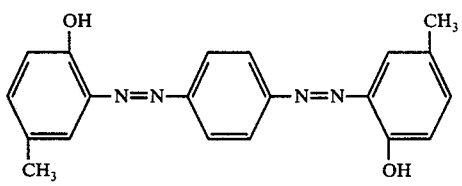 (XV)

is obtained which dyes polyester fabric in a reddish yellow shade.

EXAMPLE 11

If in Example 2 the 180 parts by weight of phenol are replaced by 207 parts by weight of 3-methyl-phenol and the process is otherwise carried out as has been described in said Example, the disazo dyestuff of the formula (XVI)

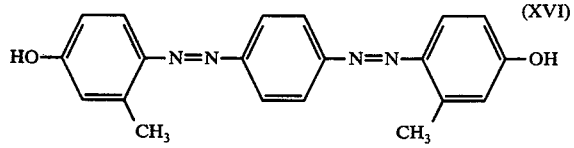 (XVI)

is obtained which is excellently suitable, according to German Patent Specification No. 1 644 261, for the dyeing of polyester fiber material and yields strong orange color shades on the same.

EXAMPLE 12

If in Example 2 the 108 parts by weight of p-phenylene-diamine are replaced by 142.5 parts by weight of 2-chloro-1,4-diamino-benzene and the reaction is otherwise carried out as has been described in said Example, the dyestuff of the formula (XVII)

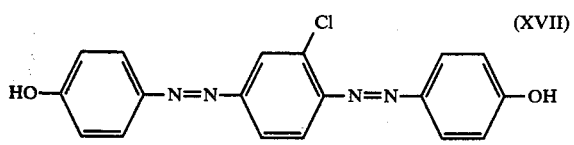 (XVII)

is obtained which according to German Offenlegungsschrift No. 1 469 774, Example 7, dyes polyester and cellulose acetate fiber material in orange color shades having good fastness properties.

We claim:

1. Process for the manufacture of a disazo dyestuff of the formula

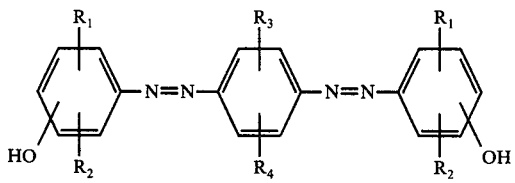

in which $R_1$ and $R_2$ each stand for hydrogen, chlorine, bromine, alkyl of 1 to 4 carbon atoms or alkoxy of 1 to 4 carbon atoms, $R_3$ and $R_4$ each stand for hydrogen, chlorine, bromine, nitro, trifluoromethyl, alkyl of 1 to 4 carbon atoms or alkoxy of 1 to 4 carbon atoms, and the hydroxyl groups each stand in 2- or 4-position to the azo groups, which comprises diazotizing a 2- or 4-hydroxy-4'-aminoazobenzene of the formula

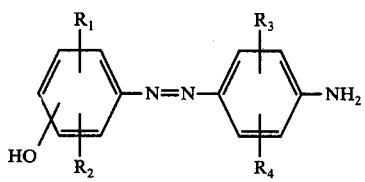

in which $R_1$, $R_2$, $R_3$ and $R_4$ are defined as above, with an alkali metal nitrite in an aqueous mineral acid, the normality of which being about $10^{-2}$ to 5, in the presence of a phenol capable of being coupled of the formula

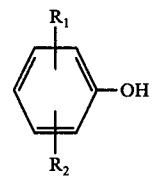

in which $R_1$ and $R_2$ are defined as above and subsequently reacting the diazonium salt obtained with the said phenol by raising the pH to a value between about 3 and 11.

2. The process as claimed in claim 1, wherein the diazotization of the compound is carried out in an aqueous mineral acid, the normality of which being $10^{-1}$ to 2.

3. The process as claimed in claim 1, wherein te diazotization of the compound is carried out in hydrochloric acid, sulfuric acid or phosphoric acid.

4. The process as claimed in claim 1, wherein in the diazotization process the mineral acid is introduced into the prepared solution of the hydroxyaminoazobenzene, of the phenol and of an alkali metal nitrite in aqueous sodium hydroxide solution.

5. The process as claimed in claim 1, wherein in the diazotization process a solution of the hydroxyaminoazobenzene, of the phenol and of an alkali metal nitrite in aqueous sodium hydroxide solution is introduced into the present mineral acid.

6. The process as claimed in claim 1, wherein in the diazotization reaction an aqueous solution of an alkali metal nitrite solution is introduced into the prepared aqueous suspension of the hydroxyaminoazobenzene and of the phenol in an aqueous mineral acid.

* * * * *